United States Patent Office 3,770,775
Patented Nov. 6, 1973

3,770,775
TETRAMETHYLENUMBELLIFERONE DIPHENYL-4-ACETATE
Gian Paolo Chiusoli and Mario Ferraris, Novara, and Giuliana Baldratti and Milena Menozzi, Milan, Italy, assignors to Societá Farmaceutici Italia, Milan, Italy
No Drawing. Filed Aug. 27, 1971, Ser. No. 175,745
Claims priority, application Italy, Aug. 31, 1970, 29,177/70
Int. Cl. C07d 7/26
U.S. Cl. 260—343.2 R                         1 Claim

ABSTRACT OF THE DISCLOSURE

A 4-diphenylacetic acid derivative is reacted with tetramethylenumbelliferone to form tetramethylenumbelliferone diphenyl-4-acetate. The condensation takes place in the presence of a suitable solvent, such as benzene, and of an alkaline hydroxide, such as sodium hydroxide, at the temperature between 20° and 30° C. and over a period of time ranging from 3 to 6 hours. Tetramethylenumbelliferone diphenyl-4-acetate is useful as an antiinflammatory agent.

---

The present invention relates to a new diphenylacetic acid derivative and the process for the preparation thereof.

More particularly, the new compound corresponds to the formula:

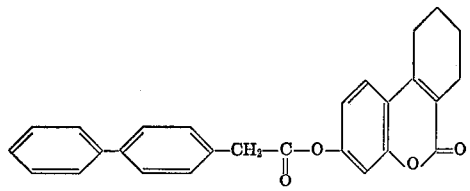

and shows an interesting anti-inflammatory activity with no toxicity or other undesired side effects. The process for the preparation of the new compound consists in reacting a 4-diphenylacetic acid derivative, preferably chloride, with tetramethylenumbelliferone (Italian Pat. No. 791,-170). The condensation takes place in the presence of a suitable solvent, such as benzene, and of an alkaline hydroxide, such as sodium hydroxide, at the temperature between 20° and 30° C. and over a period of time ranging from 3 to 6 hours.

The reaction scheme may be represented as follows:

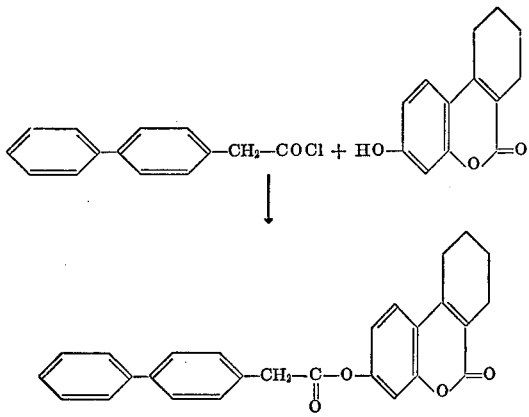

The compound of the present invention displays a very strong anti-inflammatory activity, which has been determined according to the schemes used for the characterization of the biologic outline of non-steroid drugs having anti-inflammatory activity. The acute toxicity and the ulcerogenic activity have also been determined "per os" and intraperitoneously in the rat.

The biologic activity of tetramethylenumbelliferone dipheny-4-acetate (TMUDA) has been evaluated in comparison with the activity of some of the best known nonsteroid anti-inflammatory compounds such as phenylbutazone, indometacine, acetylsalicylic acid and 4-diphenylacetic acid, which belongs to the structure of the molecule of the new compound.

The same substances have been employed as a reference for the evaluation of the toxicity and of the ulcerogenic activity of the compound under examination.

In order to point out the activity of the drug on several kinds of inflammation, three methods have been employed:

(1) U.V. erythema in the guinea-pig, according to Winder et al. (C. V. Winder, J. Wax, V. Burr, Arch. int. Pharmacodyn Ther., 116, 261–292, 1958).

The compounds, suspended in 5% gum arabic, had been administered orally to the animals in an amount of 1 ml./100 g. of bodily weight an hour before or immediately after exposure to the U.V. rays.

The data obtained are reported in Table I.

TABLE I

| Compound | Number animals | Dose, mg./kg. | Percent inhibition of erythema |
|---|---|---|---|
| TMUDA | 9 | 18.75 | 31.7 |
|  | 9 | 37.5 | 48.4 |
|  | 10 | 75 | 91.67 |
| Diphenylacetic acid | 8 | 2.5 | 33.34 |
|  | 8 | 5 | 73 |
| Phenylbutazone | 10 | 10 | 15 |
|  | 5 | 15 | 56.67 |
|  | 8 | 20 | 70 |
| Acetylsalicylic acid | 10 | 100 | 33.4 |
|  | 8 | 200 | 96 |
| Indometacine | 7 | 3 | 9.7 |
|  | 7 | 6 | 31 |
|  | 8 | 12 | 66 |

(2) Carrageenine podalic edema, evaluated in the rat by the Winter et al. test (C. A. Winter, E. A. Risley and G. W. Muss, Proc. Soc. Exp. Biol—N.Y., 111, 544–547, 1963).

The drugs, suspended in a 5% gum arabic solution had been administered orally in a volume of 1 ml./100 g. of bodily weight, an hour before the injection of carrageenine effected in the right plantar eponeurosis. The edema volume developed was evaluated by measuring the volume of the paw at the moment of the injection of carrageenine and three hours after.

The data obtained are reported in Table II.

TABLE II

| Compound | Number animals | Dose, mg./kg. | Percent inhibition of paw edema |
|---|---|---|---|
| TMUDA | 11 | 37.5 | 12.5 |
|  | 11 | 75 | 28.4 |
|  | 12 | 150 | 66.42 |
| Diphenylacetic acid | 11 | 25 | 37.5 |
|  | 11 | 50 | 56.8 |
|  | 11 | 100 | 62.5 |
| Phenylbutazone | 12 | 25 | 34.62 |
|  | 12 | 50 | 61.72 |
| Acetylsalicylic acid | 10 | 75 | 38.4 |
|  | 10 | 150 | 69.3 |
|  | 10 | 300 | 78.5 |
| Indometacine | 10 | 2.5 | 31.9 |
|  | 9 | 5 | 48.0 |
|  | 9 | 10 | 62.0 |

(3) Adjuvant experimental arthritis, according to the processes proposed by Pearson and Wood (Arth. and Rheum., 2, 440–459, 1959) and by Werd and Jones (Arth. and Rheum. 5, 125–126, 1962).

Grown up male rats, immune from pathogenic germs, divided in 5 groups of 12 animals each, were used. A group, with adjuvant injection only, comprised the arthritic and control animals (C.A.); another group which had received the vehicle only, represented the normal control animals (N.C.); the remaining three groups injected with adjuvant, were treated with gradual doses of the drug under examination. The drugs, suspended in 5% gum arabic, had been administered daily by oral route, in a volume of 0.5 ml./100 g. of bodily weight for 20 days. The butyric mycobacterium employed as adjuvant, has been killed in the warm, 0.5% suspended in mineral oil and injected (0.2 ml.) into the plantar eponeurosis of the hind left paw. At fixed times, the following parameters had been determined: bodily weight, rectal temperature, erythrosedimentation speed (E.S.S.), inflammatory unity (I.U.), volume of the injected paw (V.P.), arthritism percentage and arthritic index (A.I.).

The data noticed on the 21st day after the inoculation are reported in Table III.

Table IV summarizes the results (average number of ulcers and percentage of ulcerous animals) obtained by administration of increasing doses of the various examined products. All the compounds produced ulcerous lesions in the fasting rat. The average number of ulcers per rat is the most satisfying parameter to evaluate the seriousness of the ulcerous lesions. However, a good proportionality does not always exist between dose and effect.

This proportionality is satisfying only for some compounds (Indometacine and Phenylbutazone) and not for others such as aspirin. In this case, after reaching the highest value, the ulcerogenic activity decreases by increasing the dosage.

Indometacine and phenylbutazone are able to produce many ulcers per animal (high average number of ulcers), while the compound of the invention (TMUDA), even at the high tested doses, shows an ulcerogenic power, lower than that of the above-mentioned compounds.

Table V reports the minimum ulcerogenic doses in the rat, the anti-phlogistic activity in the guinea pig ($ED_{50}$) and the relative therapeutic indexes. The data reported

TABLE III

| Treatment | Dose, mg./kg. day | Number animals | E.S.S.±E.S. | I.U.±E.S. | Vol. of paw, ml.±E.S. | A.I.±E.S. | Arthritic, rats/total | |
|---|---|---|---|---|---|---|---|---|
| N.C | | 8 | 0.25±0.06 | 5.67±1.12 | 2.27±0.10 | | 0/8 | |
| A.C | | 11 | 2.85±0.49 | 31.60±2.74 | 5.27±0.27 | 2.82±0.64 | 9/11 | (81.8%) |
| Arthritis plus TMUDA | 25 | 9 | 4.28±1.40 | 28.22±4.06 | 4.91±0.29 | 33.3±0.93 | 6/9 | (66.6%) |
|  | 50 | 9 | 1.25±0.35 | 16.88±3.08 | 3.99±0.36 | 1.78±0.62 | 6/9 | (66.6%) |
|  | 100 | 7 | 1.03±0.22 | 14.70±1.56 | 3.63±0.27 | 0.57±0.28 | 4/7 | (42.8%) |
| N.C | | 11 | 0.13±0.05 | 9.8±1.98 | 2.81±0.07 | | 0/11 | (60%) |
| A.C | | 10 | 1.46±0.62 | 66.0±18.83 | 5.33±0.40 | 2.25±0.70 | 6/10 | (60%) |
| Arthritis plus phenylbutazone | 25 | 10 | 1.37±0.60 | 98.8±12.30 | 4.01±0.19 | 1.33±0.58 | 6/10 | (60%) |
|  | 50 | 9 | 1.05±0.21 | 78.7±12.50 | 4.07±0.14 | 1.40±0.58 | 4/9 | (44.4%) |
|  | 100 | 8 | 1.25±0.54 | 44.2±10.96 | 3.57±0.13 | 0.13±0.13 | 1/8 | (12.5%) |

Besides, the tetramethylenumbelliferone diphenyl-4-acetate shows a certain antipyretic activity, while it is inactive in blocking the pain caused by a nociceptive stimulation of the skin receptors. This product is therefore lacking in effects on the central nervous system.

The lack of analgesic effect, noticed also in the "writhing test" places the compound of the present invention with those products which can be considered as pure anti-inflammatory drugs. Furthermore, the new compound shows, if compared with the others, an interesting dissociation between the anti-inflammatory activity and other effects such as the ulcerogenic effect and especially all the toxic activities which may be manifested to the extremes with death.

The ulcerogenic activity had been evaluated in 100–120 g. Sprague-Dowley male rats fasting for 24 hours in order to promote the appearance of experimental ulcers. Substances suspended in 5% gum arabic for a total volume of 1 ml. per rat, were administered with a gastric probe. The control animals received 1 ml. of arabic gum. The stomachs, drawn 4 hours after the administration of the substances and filled with 10 ml. of air, were opened along the great curvature. The lesions (ulcers) present in the glandular portion of the stomach were counted with a magnifying lens. The seriousness of the lesions is expressed by the average number of ulcers per animal (total amount of ulcers/number of animals) and by the percentage of ulcerous rats. Furthermore, a therapeutic index has been fixed. This is defined by the ratio between the minimum ulcerogenic dose and the dose inhibiting U.V. erythema in 50% of the animals. The minimum ulcerogenic dose is the first of the experimental doses capable of producing in the treated animals statistically significant gastric lesions, superior to those of the test animals (24 h. fast+1 ml. of gum arabic/rat).

The therapeutic index so defined is arbitrary, like other similar indexes, also for the results obtained in two different species of animals have been compared reciprocally. This is due to the fact that the anti-phlogistic activity in the rat is not always fit for a strictly quantitative evaluation.

clearly show that the two activities, the anti-phlogistic and the ulcerogenic activity, are not closely connected as had been previously thought.

If we consider that the main anti-inflammatory products examined show their well known gastric lesions at strictly anti-inflammatory doses and that the therapeutic indexes, in confirmation of the clinical data, are lower or slightly higher than 1 in the case of phenylbutazone, tetramethylenumbelliferone diphenyl-4-acetate may result less gastro-dangerous in the man. In fact, its therapeutic index is clearly good.

Table IV reports the ulcerogenic activity of non-steroid anti-inflammatory products, while Table V reports the minimum ulcerogenic doses in the rat, the anti-phlogistic activity in the guinea pig ($ED_{50}$) and the relative therapeutic indexes.

TABLE IV

| Treatment | dose, mg./kg.,/os | Number rats | Average number ulcers/rat | Percent ulcerous rats |
|---|---|---|---|---|
| Controls | | 93 | 1.04 | 57.5 |
| Indometacine | 1.56 | 6 | 0.66 | 50.0 |
| | 3.12 | 12 | 2.16 | 83.5 |
| | 6.25 | 12 | 8.00 | 91.5 |
| | 12.5 | 16 | 9.15 | 100.0 |
| | 25.0 | 10 | 8.40 | 90.0 |
| | 50.0 | 10 | 13.40 | 100.0 |
| Acid phenylbutazone | 25.0 | 6 | 1.16 | 83.0 |
| | 50.0 | 12 | 2.08 | 83.5 |
| | 100.0 | 17 | 3.74 | 88.0 |
| | 200.0 | 18 | 10.20 | 95.0 |
| Aspirin | 6.25 | 6 | 2.16 | 100.0 |
| | 12.5 | 6 | 2.81 | 100.0 |
| | 25.0 | 6 | 3.00 | 83.5 |
| | 50.0 | 15 | 4.00 | 100.0 |
| | 100.0 | 18 | 6.55 | 100.0 |
| | 200.0 | 16 | 6.95 | 100.0 |
| | 400.0 | 6 | 5.35 | 67.0 |
| | 800.0 | 5 | 5.80 | 100.0 |
| TMUDA | 200 | 6 | 2.00 | 83.5 |
| | 400 | 6 | 1.16 | 83.5 |
| | 800 | 12 | 1.77 | 58.0 |
| | 1,200 | 4 | 5.00 | 100.0 |

TABLE V

| Compound | Minimum ulcerogenic dose in the rat, mg./kg., os | ED$_{50}$ in the guinea pig, mg./kg., os | Therapeutic index |
|---|---|---|---|
| Indometacine | 3.125–6.25 | 6.5 | 0.48–0.96 |
| Aspirin | 12.5 | 125 | 0.1 |
| Acid phenylbutazone | 50 | 20 | 2.5 |
| TMUDA | 400–1,200 | 31 | 2.9–38.7 |

The acute toxicity tests had been carried out employing as animal, the grown up Alal rat (Swiss strain), of both sexes, having an average starting weight of 20 g.±2, fasting for 2 hours, placed for some days in the conditions of the stabularium. For each determination of LD$_{50}$ have been employed three levels of dose, administered to 10 subjects (5 males+5 females) each: the products have been administered by oral route (gastric probing) or by endoperitoneal route (E.P.), anyway vehicled in psuedo-solution of 5% gum acacia in water in the volume of 5 ml./100 g. of bodily weight. The cumulative percentage mortality data had been worked up statistically by the probits method (D. J. Finney, Probit Analysis, 1952) in order to calculate the LD$_{50}$ and the corresponding fiducial limits for P=0.05.

The data reported in Table IV show that the new compound is easily endured by the animal at very high doses (7.5 g./kg. bodily weight).

TABLE VI

| Compound | Fiducial limits, P=0.05 | |
|---|---|---|
| | LD$_{50}$ mg./kg., oral route | E.p. |
| TMUDA | 7,500 (endured) | 2,812 (2,108–3,749) |
| Diphenylacetic acid | 382.8 (234.1–626) | 490.9 (441.6–539.7) |
| Phenylbutazone | 1,029 (882.5–1,199) | |
| Acetylsalicylic acid | 999.7 (885.6–1,307) | |
| Indometacine | 182.8 (145.9–229.1) | |

The following example is to illustrate the invention without limiting the same.

EXAMPLE 24.4 g. of sodium hydroxide and 310 ml. of water were poured into a 3 l. flask with rapid shaking. 121.09 g. of tetramethylenumbelliferone were added to the solution and the mixture shaken until a complete brown solution was obtained. 230 ml. of benzene were added and then always with rapid shaking, a solution of 129.19 g. of 4-diphenylacetic acid chloride in 510 ml. of benzene was added dropwise. The shaking is maintained rapidly for 4–5 hours, at room temperature. While the color becomes clearer, the formation of a cream-colored precipitate is noted. At the end of the shaking, the whole was diluted with 5 liters of benzene, shaken and the red-orange benzene solution separated was washed with 300 ml. of a 5% sodium bicarbonate solution then with a sodium chloride solution until neutrality. The product was dried on anhydrous sodium sulfate, the solvent evaporated off and 240 g. of crude product were obtained. This is dissolved in hot ethyl acetate and added with petroleum ether (ratio 3:1). After standing at room temperature, 184 g. of crude product, M.P. 146°–148° C. were obtained, yield 80%. The pureness of the compound is controlled chromatographically on silica gel (TLC), eluent: benzene-petrol-ethyl acetate (25:5:70).

A single spot is detected either by Wood light or after spraying with potassic permanganate diluted solution.

At the I.R. (KBr) the following bands were noted: 770, 750, 825, 1115, 1725, 1780 cm.$^{-1}$.

At the U.V. (95% ethanol) the results were: $\lambda_{max}$=250 m$\mu$ ($\epsilon$=28,500) $\lambda_{max}$=311 ($\epsilon$=14,000).

What is claimed is:

1. Tetramethylenumbelliferone diphenyl-4-acetate.

References Cited
UNITED STATES PATENTS
2,884,427  4/1959  Emerson et al. ____ 260—343.2

JOHN M. FORD, Primary Examiner

U.S. Cl. X.R.

424—279

PO-1050
(5/69)

UNITED STATES PATENT OFFICE
CERTIFICATE OF CORRECTION

Patent No. __3,770,775__    Dated __November 6, 1973__

Inventor(s) __GIAN PAOLO DHIUSOLI et al__

It is certified that error appears in the above-identified patent and that said Letters Patent are hereby corrected as shown below:

In the heading to the printed specification, line 9,

"29,177/70" should read --No. 29177 A/70--

Signed and sealed this 11th day of June 1974.

(SEAL)
Attest:

EDWARD M. FLETCHER, JR.
Attesting Officer

C. MARSHALL DANN
Commissioner of Patents